(12) United States Patent
Bolotnikoff

(10) Patent No.: US 9,021,432 B2
(45) Date of Patent: Apr. 28, 2015

(54) ENRICHMENT OF ENTITY RELATIONAL MODEL

(71) Applicant: David Lotan Bolotnikoff, Tzur Moshe (IL)

(72) Inventor: David Lotan Bolotnikoff, Tzur Moshe (IL)

(73) Assignee: SAP SE, Walldorf (DE)

( * ) Notice: Subject to any disclaimer, the term of this patent is extended or adjusted under 35 U.S.C. 154(b) by 36 days.

(21) Appl. No.: 13/785,686

(22) Filed: Mar. 5, 2013

(65) Prior Publication Data

US 2014/0258975 A1   Sep. 11, 2014

(51) Int. Cl.
*G06F 9/44* (2006.01)

(52) U.S. Cl.
CPC ........................................ *G06F 8/70* (2013.01)

(58) Field of Classification Search
CPC .......................................................... G06F 8/70
USPC .......................................... 717/101–113, 120
See application file for complete search history.

(56) References Cited

U.S. PATENT DOCUMENTS

| | | | |
|---|---|---|---|
| 5,295,222 A | | 3/1994 | Wadhwa et al. |
| 6,609,128 B1 * | | 8/2003 | Underwood ................. 707/610 |
| 7,047,518 B2 | | 5/2006 | Little et al. |
| 7,735,062 B2 | | 6/2010 | Melo et al. |
| 7,761,354 B2 | | 7/2010 | Kling et al. |
| 8,001,519 B2 | | 8/2011 | Conallen et al. |
| 8,407,664 B2 | | 3/2013 | Moosmann et al. |
| 8,448,137 B2 | | 5/2013 | Kaetker et al. |
| 8,522,194 B2 | | 8/2013 | Kaetker et al. |
| 2004/0024630 A1 | | 2/2004 | Ganesan et al. |
| 2004/0237066 A1 | | 11/2004 | Grundy et al. |
| 2007/0240102 A1 | | 10/2007 | Bello et al. |
| 2008/0263506 A1 | | 10/2008 | Broadfoot et al. |
| 2010/0131916 A1 | | 5/2010 | Prigge |
| 2011/0225484 A1 | | 9/2011 | Lotan-Bolotnikoff |
| 2012/0158687 A1 | | 6/2012 | Fang et al. |
| 2014/0258975 A1 | | 9/2014 | Bolotnikoff |

OTHER PUBLICATIONS

U.S. Appl. No. 13/654,198, filed Oct. 17, 2013 entitled "Displaying Different Hierarchy Levels of Computer Program Source Code", 35 pages.

* cited by examiner

*Primary Examiner* — Ted T Vo

(74) *Attorney, Agent, or Firm* — Fish & Richardson P.C.

(57) ABSTRACT

The present disclosure describes methods, systems, and computer program products for enriching an entity relational model. One computer-implemented method includes accessing entity relationship settings (ERS), entity relationship data (ERD), and software code with an entity relationship monitor (ERM), monitoring software code by a computer for changes related to software entities associated with the software code, interfacing with a software development tool to monitor for activity in the software development tool related to the software entities, determining that a change or activity related to the software entities has occurred, determining that a relatedness value associated with the software entities associated with the change or activity is within a relatedness threshold specified by the ERS, and performing a function associated with the determined change or activity.

21 Claims, 8 Drawing Sheets

```
200a
Module Accounting {
    ...
    Application App1{
        ...
        Function Func1{                              202a
            ...
            var recordset1 = select * from User;
            var recordset2 = select * from UDetails;
            ...                                      202b
        }
        Function Func2{                              204a
            ...
            var recordset1 = select * from User;
            ...
            var recordset2 = select * from UDetails;
            ...                                      204b
        }
        ...
    }
    Application App2{
        ...
        Function Func3{                              206a
            ...
            var recordset1 = select * from User;
            ...
        }
        ...
        Function Func4{
            ...
            var recordset1 = select * from UDetails;
            ...                                      206b
        }
        ...
    }
}
```

Module Client {
    ...
    Application App1{
        ...
        Function Func1{                              208a
            ...
            var recordset1 = select * from User;
            ...
        }
        ...
    }
    Application App2{
        ...
        Function Func4{
            ...
            var recordset1 = select * from UDetails;
            ...                                      208b
        }
        ...
    }
}
```

FIG. 2B

ENRICHMENT OF ENTITY RELATIONAL MODEL

BACKGROUND

During software development, an entity relational model is frequently used to design, for example, relationships, associations, interactions, messaging, and the like for software entities. Software entities may include database tables, functions, objects, threads, and other suitable entities. While current software development systems allow relationships between software entities to be defined, the software development systems fail to provide proactive recommendations of required and/or useful software entity relationships based upon prior defined software entity relationships. As a result, required and/or useful software entity relationships may be missed during software development and result in increased software development and maintenance costs, decreased software development efficiency, and duplicate software development efforts.

SUMMARY

The present disclosure relates to computer-implemented methods, computer-readable media, and computer systems for enriching an entity relational model. One computer-implemented method includes accessing entity relationship settings (ERS), entity relationship data (ERD), and software code with an entity relationship monitor (ERM), monitoring software code by a computer for changes related to software entities associated with the software code, interfacing with a software development tool to monitor for activity in the software development tool related to the software entities, determining that a change or activity related to the software entities has occurred, determining that a relatedness value associated with the software entities associated with the change or activity is within a relatedness threshold specified by the ERS, and performing a function associated with the determined change or activity.

Other implementations of this aspect include corresponding computer systems, apparatuses, and computer programs recorded on one or more computer storage devices, each configured to perform the actions of the methods. A system of one or more computers can be configured to perform particular operations or actions by virtue of having software, firmware, hardware, or a combination of software, firmware, or hardware installed on the system that in operation causes or causes the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination:

A first aspect, combinable with the general implementation, wherein the determining of the relatedness value associated with the software entities associated with the change or activity also includes determining that a ranking value associated with the software entities associated with the change or activity is within a ranking threshold specified by the ERS.

A second aspect, combinable with any of the previous aspects, wherein for detected changes to monitored software code associated with the software entities, the function includes the ERM updating the ERD to reflect the detected changes to the monitored software code.

A third aspect, combinable with any of the previous aspects, wherein for detected activity in the software development tool associated with at least one software entity, the function includes the ERM providing recommendations pertaining to a related software entity indicated in the ERD as related to the at least one software entity.

A fourth aspect, combinable with any of the previous aspects, further comprising: accessing the ERS and the software code with an executing entity relationship engine (ERE), performing a baseline analysis of the software code for the presence software entities, determining that a relatedness value associated with found related software entities in the baseline analysis of the software code is within a relatedness threshold specified by the ERS, and generating a baseline ERD and adding the found related software entities to the generated baseline ERD.

A fifth aspect, combinable with any of the previous aspects, wherein the determining of a relatedness value also includes determining that a ranking value associated with the found related software entities is within a ranking threshold specified by the ERS.

A sixth aspect, combinable with any of the previous aspects, further comprising determining that the baseline analysis of the software code is completed.

The subject matter described in this specification can be implemented in particular implementations so as to realize one or more of the following advantages. First, software entity relationships can be determined for existing software code to use as a "baseline" for proactive relational software entity recommendations. Second, a software entity relationship monitor can monitor/analyze changes made to system software code and dynamically and continuously update software entity relationship data for use by software developers and/or other stakeholders associated with software code. Third, proactive recommendations for software entities can be provided to software developers during software code development, for example while developing software/system models and as part of associated functions of searching for software entities and referring to software entities while defining properties and/or methods. Other advantages will be apparent to those skilled in the art.

The details of one or more implementations of the subject matter of this specification are set forth in the accompanying drawings and the description below. Other features, aspects, and advantages of the subject matter will become apparent from the description, the drawings, and the claims.

DESCRIPTION OF DRAWINGS

FIGS. 2A-2B illustrate example software code referring to database table software entities.

Like reference numbers and designations in the various drawings indicate like elements.

DETAILED DESCRIPTION

This disclosure generally describes computer-implemented methods, computer-program products, and systems for enriching an entity relational model.

During software development, an entity relationship model (ERM) is frequently used to design, for example, relationships, associations, interactions, messaging, and the like for software entities. Software entities may include database tables, functions, objects, threads, and other suitable entities. While current software development systems allow relationships between software entities to be defined, the software development systems fail to provide proactive recommendations of required and/or useful software entity relationships based upon prior defined software entity relationships. If, for example, software entity A is frequently used with software entity B, relationship indicates at least an indirect relationship between the two software entities. For a software application (e.g. a content provider manager) under development, useful information to provide to a software developer would include a proactive recommendation that if software entity A is selected to be used by the software application that the software developer may wish to also consider using software entity B. Also provided may be an indication of the "strength" of the relationship between software entity A and software entity B, for example whether the use of software entity B is required with the use of software entity A. Other useful information could also include a ranking of the use of software entity A and software entity B in different software code.

Figure 1:
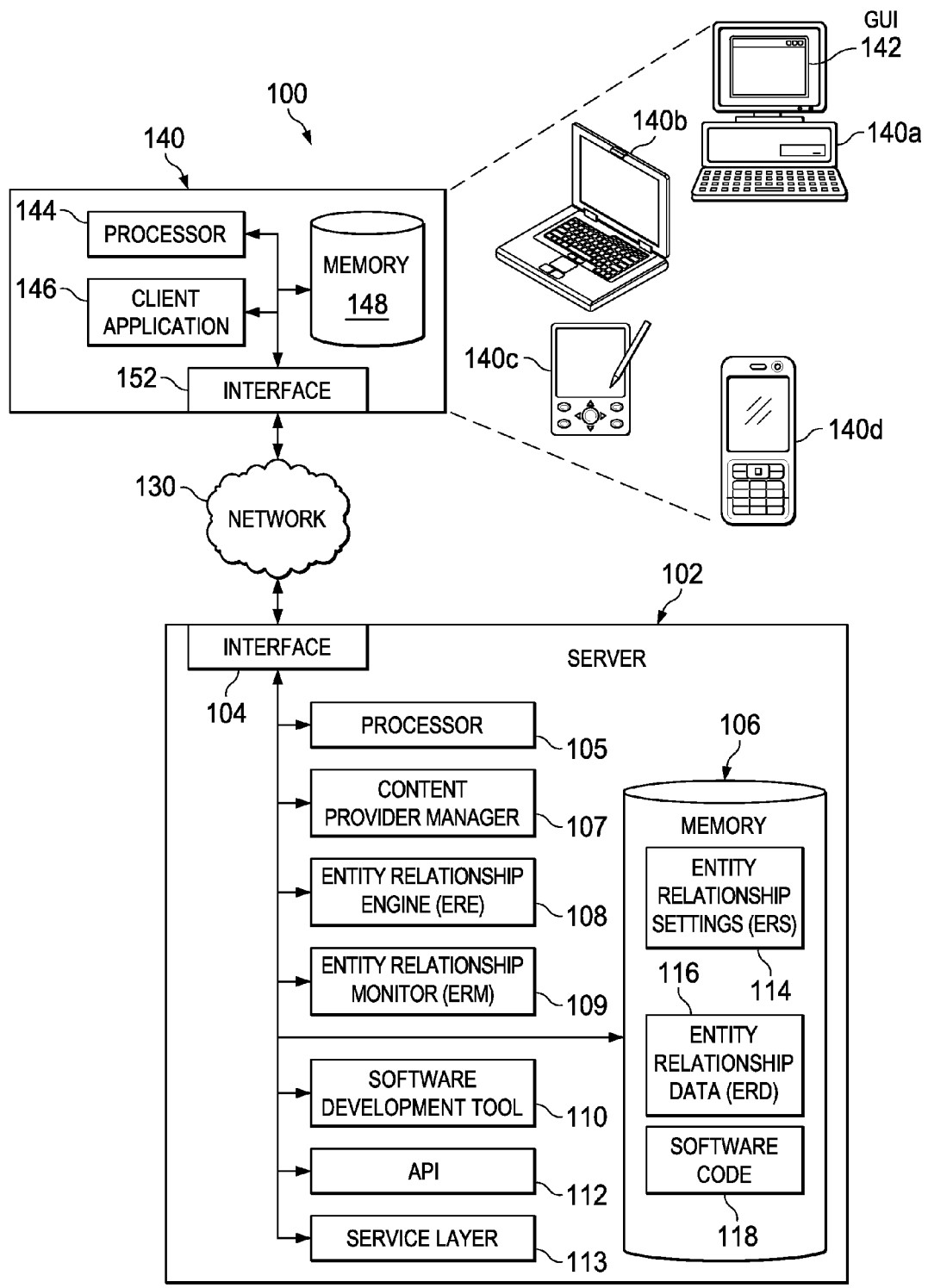
FIG. 1 is a block diagram illustrating an example distributed computing system for enriching an entity relational model.

FIG. 1 is a block diagram illustrating an example distributed computing system 100 for enriching an entity relational model. The illustrated example distributed computing system 100 includes or is communicably coupled with a server 102 and a client 140 (described below) that communicate across a network 130 (described below).

At a high level, the server 102 is an electronic computing device operable to receive, transmit, process, store, or manage data and information associated with the example distributed computing system 100. Generally, the server 102 allows users to navigate to, view, compose, modify, delete, and deploy documents as well as interface with various applications, such as software development tools. Specifically, the described computer-implemented methods, software, and systems provide functionality for enriching an ERM. In some implementations, the functionality to enrich an ERM can be provided through one or more graphical and/or non-graphical user interfaces (GUIs).

The server 102 is responsible for receiving requests, such as requests associated with software development tools and/or for specified content from one or more client applications 146 (described below) associated with the client 140 of the example distributed computing system 100 and responding to the received requests by processing said requests and sending an appropriate response/content back to the requesting client application 146. In addition to requests from the client 140, requests may also be sent from internal users, external or third-party customers, other automated applications, as well as any other appropriate entities, individuals, systems, or computers. According to one implementation, server 102 may also include or be communicably coupled with an e-mail server, a web server, a caching server, a streaming data server, and/or other suitable server.

The server 102 includes at least a content provider manager 107), entity relationship engine 108 (described below), entity relationship monitor 109 (described below), and/or software development tool 110 (described below) where at least a portion of the content provider manager 107), the entity relationship engine 108, the entity relationship monitor 109, and/or software development tool 110 is operated using requests/responses sent from/to a client 140 within and communicably coupled to the illustrated example distributed computing system 100 using the network 130. In some implementations, requests/responses can be sent directly to server 102 from a user accessing server 102 directly. In some implementations, the server 102 may store a plurality of content provider managers 107), entity relationship engines 108, entity relationship monitors 109, and/or software development tools 110. In some implementations, where the server 102 includes a web server, one or more of the components of the server 102 represent web-based applications accessed and executed by the client 140 using the network 130 or directly at the server 102 to perform the programmed tasks or operations of the various components of server 102.

In some implementations, any and/or all of components of the server 102, both hardware and/or software, may interface with each other and/or the interface using an application programming interface (API) 112 and/or a service layer 113. The API 112 may include specifications for routines, data structures, and object classes. The API 112 may be either computer-language independent or dependent and refer to a complete interface, a single function, or even a set of APIs. The service layer 113 provides software services to the example distributed computing system 100. The functionality of the server 102 may be accessible for all service consumers using this service layer. Software services, such as those provided by the service layer 113, provide reusable, defined business functionalities through a defined interface. For example, the interface may be software written in JAVA, C++, or other suitable language providing data in extensible markup language (XML) format or other suitable format.

While illustrated as an integrated component of the server 102 in the example distributed computing system 100, alternative implementations may illustrate the API 112 and/or the service layer 113 as stand-alone components in relation to other components of the example distributed computing system 100. Moreover, any or all parts of the API 112 and/or the service layer 113 may be implemented as child or sub-modules of another software module, enterprise application, or hardware module without departing from the scope of this disclosure.

The server 102 includes an interface 104. Although illustrated as a single interface 104 in FIG. 1, two or more interfaces 104 may be used according to particular needs, desires, or particular implementations of the example distributed computing system 100. The interface 104 is used by the server 102 for communicating with other systems in a distributed environment—including within the example distributed computing system 100—connected to the network 130; for example, the client 140 as well as other systems communicably coupled to the network 130 (not illustrated). Generally, the interface 104 comprises logic encoded in software and/or hardware in a suitable combination and operable to communicate with the network 130. More specifically, the interface 104 may comprise software supporting one or more communication protocols associated with communications such that the network 130 or interface's hardware is operable to communicate physical signals within and outside of the illustrated example distributed computing system 100.

The server 102 includes a processor 106. Although illustrated as a single processor 106 in FIG. 1, two or more processors may be used according to particular needs, desires, or particular implementations of the example distributed computing system 100. Generally, the processor 106 executes instructions and manipulates data to perform the operations of the server 102. Specifically, the processor 106 executes the functionality required to enrich an ERM.

The server 102 also includes a memory 107 that holds data for the server 102. Although illustrated as a single memory 107 in FIG. 1, two or more memories may be used according to particular needs, desires, or particular implementations of the example distributed computing system 100. While memory 107 is illustrated as an integral component of the server 102, in alternative implementations, memory 107 can be external to the server 102 and/or the example distributed computing system 100. In some implementations, the memory 107, i.e., the content repository that holds the description and/or data for all objects in the ERP 102, includes one or more instances of entity relationship settings 114, entity relationship data 116, and/or software code 118.

The entity relationship settings (ERS) 114 may represent any suitable conditions, parameters, variables, algorithms, instructions, constraints, references, data, flags, and any other appropriate information used to define software entities, determine whether software entities are indicated by an entity relationship engine (ERE) 108 and/or an entity relationship monitor (ERM) 109 as related and how relationships are ranked against each other (sensitivity), how the determined "relatedness" is to be described, and/or what data is recorded in the entity relationship data 116. For example, if a software entity A is physically referred to in a line of software code that is directly adjacent to line of software code referring to software entity B, the sensitivity settings of the ERS 114 may indicate to the ERE 108 and/or ERM 109 that software entity A and software entity B within a particular function "Func1" associated with an application "App1," further associated with a module "Accounting" should be indicated in the ERD 116 as highly related and with an associated high-value relatedness ranking. On the contrary, if in the same module "Client," the software entity A is referred to in a line of software code in function "Func1" and application "App1" and the software entity B is referred to in a line of software code in function "Func4" and application "App2," the sensitivity settings in the ERS 114 may indicate to the ERE 108 and/or ERM 109 that software entity A and software entity B should be indicated in the ERD 116 with a low relatedness (or with no relatedness) and with a corresponding associated low-value relatedness ranking. In some implementations, the ERS 114 can be accessed, created, updated, and/or deleted by the content provider manager 107, ERE 108, ERM 109 and/or a software development tool 110. In some implementations, the client 140 can access, create, update, and/or delete the ERS 114 using one or more components of the example distributed computing system 100. While illustrated as integral to memory 107 or server 102, in some implementations, the ERS 114 can stand apart from memory 107 and/or the server 102 as long as it is accessible to one or more components of the example distributed computing system 100 using network 130 or other suitable access method. In some implementations, the ERS 114 can be stored in a database table, flat file, text file, binary file, and/or any other suitable type "file" and in any specific data structure.

The entity relationship data (ERD) 116 is any type of data in any form used to represent "relatedness" of software entities. For example, continuing with the example provided above, if software entity A and software entity B are determined to be highly related, the ERD 116 can contain both how and to what degree the software entities A and B are related. How the software entities are related may include, for example, the names of the software entities A and B, their associated function (e.g., "Func1"), application (e.g., "App1"), and module (e.g., "Accounting"). To what degree the software entities are related may include, for example, a relatedness value (e.g., physical proximity, within same module, low, medium, high, etc.), and a relatedness ranking value (e.g., 0.9) as well as other suitable values. In some implementations, the ERD 116 can also contain contextual data as to when software entities may or may not be considered related, for example due to security constraints, access by specific users, particular time constraints, etc. In some implementations, the ERD 116 can be accessed, created, updated, and/or deleted by the content provider manager 107, ERE 108, ERM 109 and/or a software development tool 110. In some implementations, the client 140 can access, create, update, and/or delete the ERD 116 using one or more components of the example distributed computing system 100. While illustrated as integral to memory 107 or server 102, in some implementations, the ERD 116 can stand apart from memory 107 and/or the server 102 as long as it is accessible to one or more components of the example distributed computing system 100 using network 130 or other suitable access method. In some implementations, the ERD 116 can be stored in a database table, flat file, text file, binary file, and/or any other suitable type "file" and in any specific data structure. In some implementations, the ERD 116 can be stored in an index database table and represent a "matrix" type format. In other implementations, the ERD 116 may be stored in a non-database-type memory and in any suitable structure/format. In some implementations, one or more ERDs 116 can represent relatedness of one or more software entities.

The software code 118 may represent any collection of computer instructions written using some human- and/or computer-readable characters/language, for example alphanumeric text. The software code 118 specifies through the computer instructions actions to be performed by a computer and refers to software entities and other software code elements including database tables, models, objects, structures, values, conditions, parameters, flags, variables, algorithms, functions, methods, constraints, references, and any other suitable information used and/or modified by the specified actions. Software code may include source code and executable code as well as various intermediate forms of code as translated between source code and executable code, such as by a compiler. For example, software code 118 may describe a model of a software system containing one or more software entities, such as references to database tables, objects, etc. In some implementations, the software code can be accessed, created, updated, and/or deleted by the software development tool 110 as well as the ERE 108 and/or ERM 109. In some implementations, the client 140 can also access, create, update, and/or delete the software code 118 using one or more components of the example distributed computing system 100, for example by using the software development tool 110. While illustrated as integral to memory 107 of server 102, in some implementations, the software code 118 can stand apart from memory 107 and/or the server 102 as long as it is accessible to one or more components of the example distributed computing system 100 using network 130 or other suitable access method. In some implementations, the software code 118 can be stored in a database table, flat file, text file, binary file, and/or any other suitable type "file" and in any specific data structure.

The content provider manager 107 is any application of any type that enables the client 140 to request and view on the client 140 content associated with the server 102 after obtaining content from various components of the server 102 and/or a content provider (not illustrated) in response to a received request from the client 140. A content provider may be, for example, applications and data on the server 102 and/or external services, business applications, business application servers, databases, RSS feeds, document servers, web servers, streaming servers, caching servers, or other suitable content sources. In some implementations, the content provider manager 107 can act as a "gateway" to client-requested content and applications associated with the server 102 until specific conditions, such as security verification, processing completion, authorization from an application, and/or other suitable conditions are met. For example, a request received from the client 140 to execute the software development tool 110 many not return content to the client 140 until the software development tool indicates that is has fully started and is ready to receive and/or process development requests from the client 140. In another example, the content provider manager may intermittently send content to the client 140 as predefined sized data chunks and/or as continuously streaming data. In some implementations, the content provider manager 107 also allows connections to various other content providers, queries the various content providers with regard to available/provided content, and enables a user to view, add, edit, and/or delete content associated with the server 102.

In some implementations, the content provider manager 107 can individually or in conjunction with the ERE 108 and/or ERM 109 determine that a recommendation for a software entity in software code 118 should be made to a software developer based on the ERS 114 and/or the ERD 116. In some implementations, the content provider manager 107 can interface with the ERE 108 and/or the ERM 109 to send and/or receive instructions for enriching an ERM.

In some implementations, the content provider manager 107 can use content provider manager data (not illustrated) or other suitable data stored in content provider manager 107, for example, data from the memory 107, to perform tasks associated with the server 102 or other components of the example distributed computing system 100. Content provider manager data may include any type of data associated with and/or used by the content provider manager 107, including content provider locations, addresses, storage specifications, content lists, access requirements, or other suitable data. For example, for a database content provider, the content provider manager data may include a server Internet Protocol (IP) address, URL, access permission requirements, data download speed specifications, and/or other suitable data.

Once a particular content provider manager 107 is launched, a client 140 may interactively process a task, event, or other information associated with the server 102. The content provider manager 107 can be any application, program, module, process, or other software that may determine, execute, change, delete, generate, or otherwise manage information associated with a particular client 140. A particular content provider manager 107 may operate in response to and in connection with at least one request received from other content provider managers 107, EREs 108, ERMs 109, and/or software development tools 110, including those associated with another server 102.

In some implementations, the content provider manager 107 can be and/or include a web browser. In some implementations, each content provider manager 107 can represent a network-based application accessed and executed using the network 130 (e.g., through the Internet, or using at least one cloud-based service associated with the content provider manager 107). For example, a portion of a particular content provider manager 107 may be a web service associated with the content provider manager 107 that is remotely called, while another portion of the content provider manager 107 may be an interface object or agent bundled for processing at a remote client 140. Moreover, any or all of a particular content provider manager 107 may be a child or sub-module of another software module or enterprise application (not illustrated) without departing from the scope of this disclosure. Still further, portions of the particular content provider manager 107 may be executed or accessed by a user working directly at the server 102, as well as remotely at a corresponding client 140. In some implementations, the server 102 can execute the content provider manager 107.

The entity relationship engine (ERE) 108 can be any application, program, module, process, or other software used to analyze existing software code 118 and to generate/update the ERD 116. For example, the ERE 108 may be executed by a software developer or administrator of a software development system using a client 140. The ERE 108 accesses the ERS 114 and while analyzing the software code 118 generates/updates the ERD 116 for "related" database table software entities discovered in the analyzed software code 118 based upon settings specified in the ERS 114 used to determine "relatedness." In some implementations, the ERE 108 can also update the ERS 114 based upon analyzed software code 118. For example, if a desired software entity is repeatedly not found in analyzed software code 118, a priority value may be set to a low value for that particular type of software entity. In contrast, a second particular type of software entity may be repeatedly found, although not indicated in the ERS 114 as of interest, but the ERE 108 may indicate to the software developer or administrator that it should be considered for inclusion in the ERS 114 or can just update the ERS 114 to include the second particular type of software entity with associated default values. As will be appreciated by those of skill in the art, these representative examples illustrate possible functions of the ERE 108 and are not meant to be limiting in any way.

In some implementations, the ERE 108 can work individually and/or in conjunction with the content provider manager 107, ERM 109, and/or software development tool 110. Additionally, a particular ERE 108 associated with a particular server 102 may operate in response to and in connection with at least one request received from other content provider managers 107, EREs 108, ERMs 109, and/or software development tools 110, including those associated with another server 102. In some implementations, the ERE 108 is a "run-once" application that updates the ERS 114 and/or the ERD 116. In other implementations, the ERE 108 can be run manually, intermittently, or on the command of some other component of the example distributed computing system 100.

The entity relationship monitor (ERM) 109 can be any application, program, module, process, service, and/or other software used to dynamically analyze using the ERS 114 software code 118 and software development tool 110 activities. In some implementations, activities can include those for additions, updates, and/or deletions associated with software entities input using the software development tool 110. The ERM 109 can also generate/update the ERD 116 based upon the dynamic analysis, and to make proactive recommendations for software entities based upon the dynamic analysis. Typically, the ERM 109 runs as a service. For example, the ERM 109 may be executed on the start of an instance of the software development tool 110 by a software developer or administrator of a software development system using a client 140 following completion of the execution of the ERE 108.

If changes associated with software entities are detected in either the software code 118 and/or the software development tool 110, the ERM 109 can generate/update the ERD 116 for software entities based upon settings specified in the ERS 114. Note that in some implementations the ERM 109 can be configured to only monitor existing software entities identified in the ERD 116 while in other implementations, the ERM 109 can monitor all or a subset of software entity types whether identified in the ERD 116. In some implementations, the ERM 109 can also update the ERS 114 based upon the analyzed software code 118, detected activities in the software development tool 110, and/or updates made to the ERD 116. For example, if data related to a software entity is repeatedly updated in the software code 118 using the software development tool 110, an overall priority/ranking value for that particular software entity may be increased in the ERS 114 and/or ERD 116. In contrast, if a software entity is not updated within a threshold time frame, an overall priority/ranking value for that particular software entity may be decreased in the ERS 114 and/or ERD 116.

Another example includes the software developer renaming a software entity with the software development tool. For example, an object "Personnel" is renamed to "HRPersonnel." In this case, the ERM 109 can update the ERS 114 and/or the ERD 116 depending upon necessity to reflect the change. In some implementations, the ERM 109 can also recommend to the software developer to update all instances of the software entities within the source code and identify all necessary locations using the software development tool.

Another example includes the addition and/or deletion of a software entity that affects a relationship with another software entity. For example, if a line of software code is added to the software code 118 including the database table software entity "UDetails" in a manner that the ERS 114 indicates "UDetails" should be marked as in a relationship with database table "USER," the ERM 109 can update the ERD 116 accordingly. Similarly, if an already indicated relationship exists between database table "UDetails" and database table "USER" and a "UDetails" database table is reference is deleted from the software code 118, the ERM 109 can update the ERD 116 accordingly to reflect this change.

The ERM 109 can also make proactive recommendations for software entities based upon the ERS 114 and the ERD 116 and detected software development tool activities. For example, if a software developer searches for, drags an object of, or enters a database table software entity of "USER," a related database table "UDetails" can be recommended to the software developer due to an existing relationship between the two database table software entities reflected in the ERS 114 and/or ERD 116.

In some implementations, the ERM 109 can work individually and/or in conjunction with the content provider manager 107, ERE 108, and/or software development tool 110. Additionally, a particular ERM 109 associated with a particular server 102 may operate in response to and in connection with at least one request received from other content provider managers 107, EREs 108, ERMs 109, and/or software development tools 110, including those associated with another server 102. In some implementations, the ERM 109 can also be run manually or on the command of some other component of the example distributed computing system 100. As will be appreciated by those of skill in the art, these representative examples illustrate possible example functions of the ERM 109 in particular example circumstances and are not meant to exclude other functions consistent with this disclosure.

The software development tool 110 can include any can be any application, program, module, process, or other software used by a software developer, manager, or other stakeholder to design, write, execute, transmit, and/or store software applications. For example, the software development tool 110 can be used to design, write, execute, transmit, and/or store software code 118. In some implementations, there may be a many different software development tools 110 on the server 102, each capable of interfacing with and working with each other. The software development tool 110 can include a GUI screen builder, an editor, a compiler, a linker, and/or other facilities. In some implementations, some operations associated with the software development tool may be performed by the client 140 and its GUI 142, processor 144, memory 148, and/or other components of the example distributed computing system whether illustrated or not.

The client 140 may be any computing device operable to connect to or communicate with at least the server 102 using the network 130. In general, the client 140 comprises an electronic computing device operable to receive, transmit, process, and store any appropriate data associated with the example distributed computing system 100. The client includes a processor 144, a client application 146, a memory 148, and/or an interface 152.

The client application 146 is any type of application that allows the client 140 to navigate to/from, request, view, edit, delete, and or manipulate content on the client 140. In some implementations, the client application 146 can be and/or include a web browser. In some implementations, the client-application 146 can use parameters, metadata, and other information received at launch to access a particular set of data from the server 102. Once a particular client application 146 is launched, a user may interactively process a task, event, or other information associated with the server 102. Further, although illustrated as a single client application 146, the client application 146 may be implemented as multiple client applications in the client 140. In some implementations, the client application 146 may act as a GUI interface for components of the server 102 and/or other illustrated/not illustrated components of the example distributed computing environment 100.

The interface 152 is used by the client 140 for communicating with other computing systems in a distributed computing system environment, including within the example distributed computing system 100, using network 130. For example, the client 140 uses the interface to communicate with the server 102 as well as other systems (not illustrated) that are communicably coupled to the network 130. The interface 152 may be consistent with the above-described interface 104 of the server 102 or other interfaces within the example distributed computing system 100. The processor 144 may be consistent with the above-described processor 106 of the server 102 or other processors within the example distributed computing system 100. Specifically, the processor 144 executes instructions and manipulates data to perform the operations of the client 140, including the functionality required to send requests to the server 102 and to receive and process responses from the server 102. The memory 148 may be consistent with the above-described memory 107 of the server 102 or other memories within the example distributed computing system 100 but storing objects and/or data associated with the purposes of the client 140, possibly including cached data, container documents, GUI elements, entity relationship settings, entity relationship data, and/or software code similar to that stored in memory 107 of server 102. In some implementations, the memory 148 may be used by the server 102 and/or other component of the example distributed computing system 100 to store objects and/or data associated with the purposes of the server 102 and/or the other component of the example distributed computing system 100.

Further, the illustrated client 140 includes a GUI 142. The GUI 142 interfaces with at least a portion of the example distributed computing system 100 for any suitable purpose, including generating a visual representation of a web browser, software development tools, or the like. The GUI 142 may be used to view and navigate various web pages and/or interface with a software development tool located both internally and externally to the server 102, as well as perform other suitable operations related to an EP. In particular, the GUI 142 may be used to perform functions consistent with this disclosure for enriching an ERM.

There may be any number of clients 140 associated with, or external to, the example distributed computing system 100. For example, while the illustrated example distributed computing system 100 includes one client 140 communicably coupled to the server 102 using network 130, alternative implementations of the example distributed computing system 100 may include any number of clients 140 suitable to the purposes of the example distributed computing system 100. Additionally, there may also be one or more additional clients 140 external to the illustrated portion of the example distributed computing system 100 that are capable of interacting with the example distributed computing system 100 using the network 130. Further, the term "client" and "user" may be used interchangeably as appropriate without departing from the scope of this disclosure. Moreover, while the client 140 is described in terms of being used by a single user, this disclosure contemplates that many users may use one computer, or that one user may use multiple computers.

The illustrated client 140 is intended to encompass any computing device such as a desktop computer 140a, laptop/notebook computer 140b, wireless data port (not shown), tablet computing device 140c, smart phone 140d, personal data assistant (PDA), one or more processors within these devices, or any other suitable processing device. For example, the client 140 may comprise a computer that includes an input device, such as a keypad, touch screen, or other device that can accept user information, and an output device that conveys information associated with the operation of the server 102 or the client 140 itself, including digital data, visual and/or audio information, or a GUI 142, as shown with respect to the client 140.

FIGS. 2A-2B illustrate example software code 200a and 200b referring to database table software entities. Referring to FIG. 2A, an example software code 200a software module "Accounting" is illustrated with included applications "App1" and "App2" and associated functions "Func1," "Func 2," "Func3," and "Func4." As a first example, database table "USER" is referred to at software code line 202a and database table "UDetails" is referred to at software code line 202b both in function "Func1." For these two database table software entities, given that the two software code lines are adjacent with no intervening software code line and that they are in the same function ("Func1"), application ("App1"), and module ("Accounting"), the ERE 108 and/or the ERM 109 could consider both the "USER" and "UDetails" database tables to have a direct relationship with a high relatedness value.

As a second example, database table "USER" is referred to at software code line 204a and database table "UDetails" is referred to at software code line 204b both in function "Func2." For these two database table software entities, given that the two software code lines are nearly adjacent but separated by at least one software code line (illustrated by the intervening ellipsis " . . . ") and that they are in the same function ("Func2"), application ("App1"), and module ("Accounting"), the ERE 108 and/or the ERM 109 could consider both the "USER" and "UDetails" database tables to have a direct relationship with a slightly lower value than the software entity references in "Func1" at software code lines 202a/202b.

As a third example, database table "USER" is referred to at software code line 206a in function "Func3" and database table "UDetails" is referred to at software code line 204b in a different function "Func4." For these two database table software entities, given that the two software code lines are separated by at least one other function (again illustrated by an ellipsis between "Func3" and "Func4") but in the same application ("App2"), and module ("Accounting"), the ERE 108 and/or the ERM 109 could consider both the "USER" and "UDetails" database tables to have a more indirect relationship with a lower relatedness value than the software entity references in "Func1" at software code lines 202a/202b and those in "Func2" at software code lines 204a/204b.

Referring to FIG. 2B, as a fourth example, database table "USER" is referred to at software code line 208a in function "Func3" and database table "UDetails" is referred to at software code line 208b in a different function "Func4." For these two database table software entities, given that the two software code lines are separated by at least one other function (again illustrated by an ellipsis between "Func3" and "Func4") but in the same application ("App2"), and module ("Accounting"), the ERE 108 and/or the ERM 109 could consider both the "USER" and "UDetails" database tables to have an indirect relationship or possibly no relationship. As a result, any relatedness value recorded in the ERD 116 would have a lower value than the software entity references in "Func1" at software code lines 202a/202b, those in "Func2" at software code lines 204a/204b, and those in "Func3" and "Func4" at software code lines 206a/206b in the examples discussed with FIG. 2A.

Figure 3:
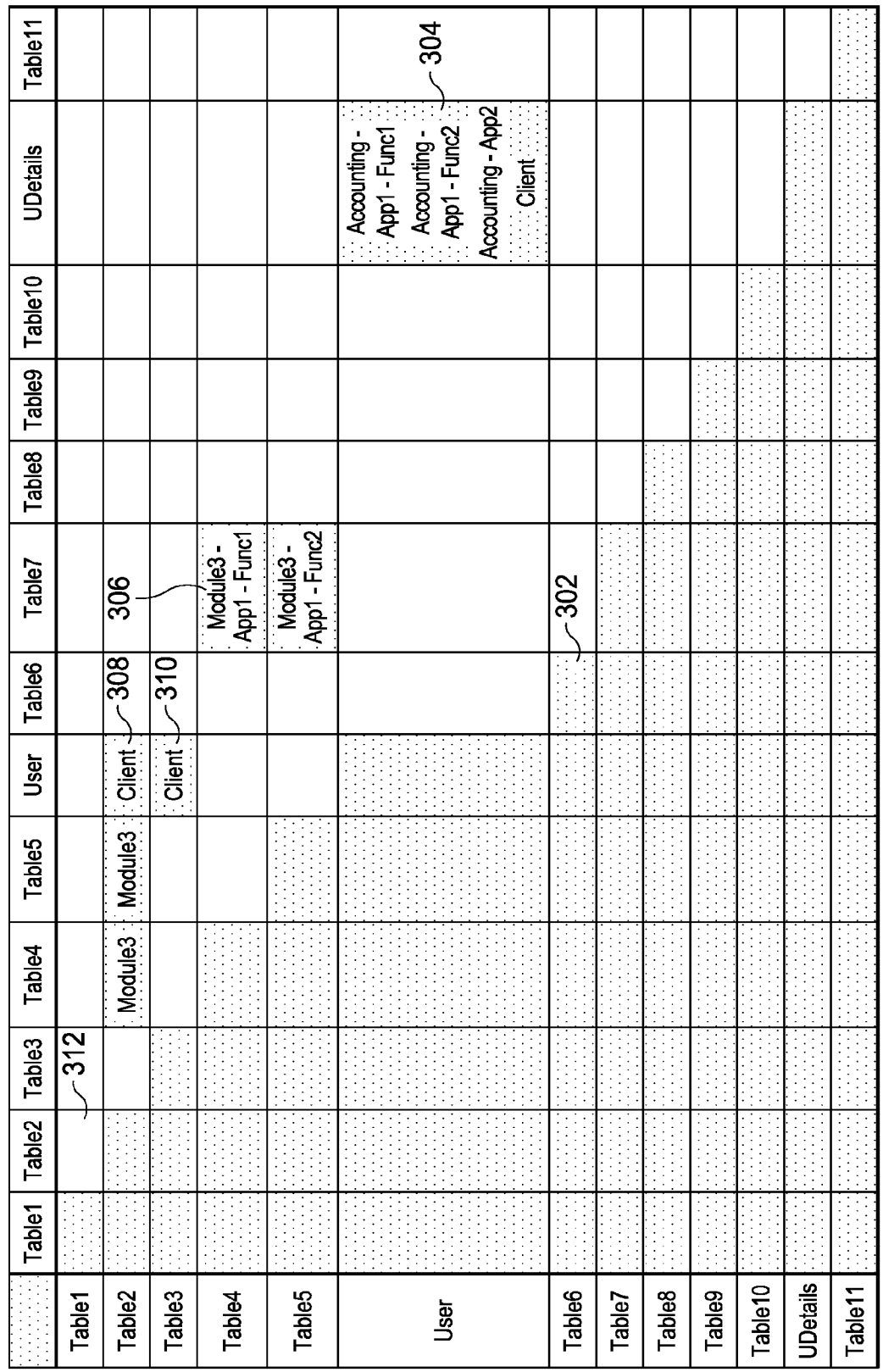
FIG. 3 illustrates example entity relationship data for database table software entities according to one implementation.

FIG. 3 illustrates example entity relationship data (ERD) 300 for database table software entities according to one implementation. Although FIG. 3 only illustrates data related to database table software entities, one of skill in the art should appreciate that the data could apply to any type of software entity even if not illustrated. The example ERD data 300 is consistent with data associated with the examples provided in the discussion of FIGS. 2A and 2B. ERD 300 is shown in a "matrix" type arrangement with all available database table software entities on the axes. In some implementations, the lower "mirrored" section of the matrix 302 may be omitted to save memory or to store other data (not illustrated).

As shown, block 304 is the intersection of the "USER" and "UDetails" database tables. Within this block, data is shown indicating a relatedness value as well as a ranking. For example, "Accounting-App1-Func1" pertains to the first example above described with respect to FIG. 2A and software code lines 202a/202b and "Accounting-App1-Func2" pertains to the second example above described with respect to FIG. 2A and software code lines 204a/204b. The inclusion of the name of the module, application, and function indicates a "depth" of relatedness, here down to the function level "Func1" or "Func2." "Accounting-App2" pertains to the third example above described with respect to FIG. 2A and software code lines 206a/206b. The fact that only the module and application are listed as a data value indicates that the relatedness between the "USER" and "UDetails" database table software entities in application "App2" is only to the level of the application. Finally, "Client" pertains to the fourth example above described with respect to FIG. 2B and software code lines 208a/208b. Here the relatedness of the "USER" and "UDetails" database table software entities are only to the module level, here module "Client." From top to bottom, block 304 each data value indicates a decreasing degree of relatedness for the "USER" and "UDetails" database table software entities where both are described. Also, block 304 from top to bottom indicates a relative ranking of relatedness. For example, "Accounting-App1-Func2" is ranked higher than "Client" for relatedness ranking. In this example, "Accounting-App1-Func1" could be ranked with a value of 0.95 while "Client" could be ranked with a value of 0.1. Any suitable ranking algorithm is envisioned to be within the scope of this disclosure. In some implementations, ranking values can also be used in a manner similar to relatedness to determine whether data is written into the ERD 116. For example, "Client" could be ranked as described above with a value of 0.1, but a required ranking threshold in the ERS 114 could require at least a ranking of 0.2 to be added to the ERD 116.

In some implementations, different types of software entities could have different additional ranking values that affect overall ranking values as described above. For example, an object could have an additional ranking value of 0.45 that is always added to a ranking calculation including the object, while a variable may only have a 0.05 additional ranking value. In some implementations, different instances of the same software entity may be ranked higher than others. For example, a larger database table may first be ranked against smaller database tables and then ranked according to other relatedness values, including proximity, etc.

Block 304 indicates that the "USER" and "UDetails" database table software entities appear together in at least four places in analyzed/monitored software code at least to the sensitivity specified by the ERS 114. It is possible that the database table software entities appear together but separated between different modules, for example the "USER" database table is in the "Accounting" module and the "UDetails" database table is referred to in the "Client" module, but the ERS 114 indicates that this determined relatedness is outside of an acceptable threshold, so no data entry is put into block 304 to indicate a relatedness exists. In some implementations, out-of-threshold relatedness values that are within a specific threshold may be stored in ERD 116 and can be retrieved if desired and/or if ERS 114 values are later changed. This could help avoid the necessity to perform additional processing if software development requirements change.

Block 306 indicates that the intersection of database table software entities "Table4" and "Table7" appear once in module "Module 3," application "App1," and function "Funct1" (not illustrated in FIGS. 2A-2B). Similarly, Blocks 308 and 310 indicate that the intersection of database table software entities "Table2"/"Table3" and "USER" appear once in module "Client" (not illustrated in FIGS. 2A-2B). Other blocks, for example block 312, indicate that there is no relatedness recorded between "Table1" and "Table2." Note that block 312 does not necessarily indicate that there is not a relationship between the associated tables.

Although the various described data in blocks 304, 306, 308, and 310 are limited to levels (application, module, and function), in other implementations, there could be more or less level categories indicated. For example, the ERS 114 may specify which levels are to be recorded within the ERD 116.

Figure 4A:
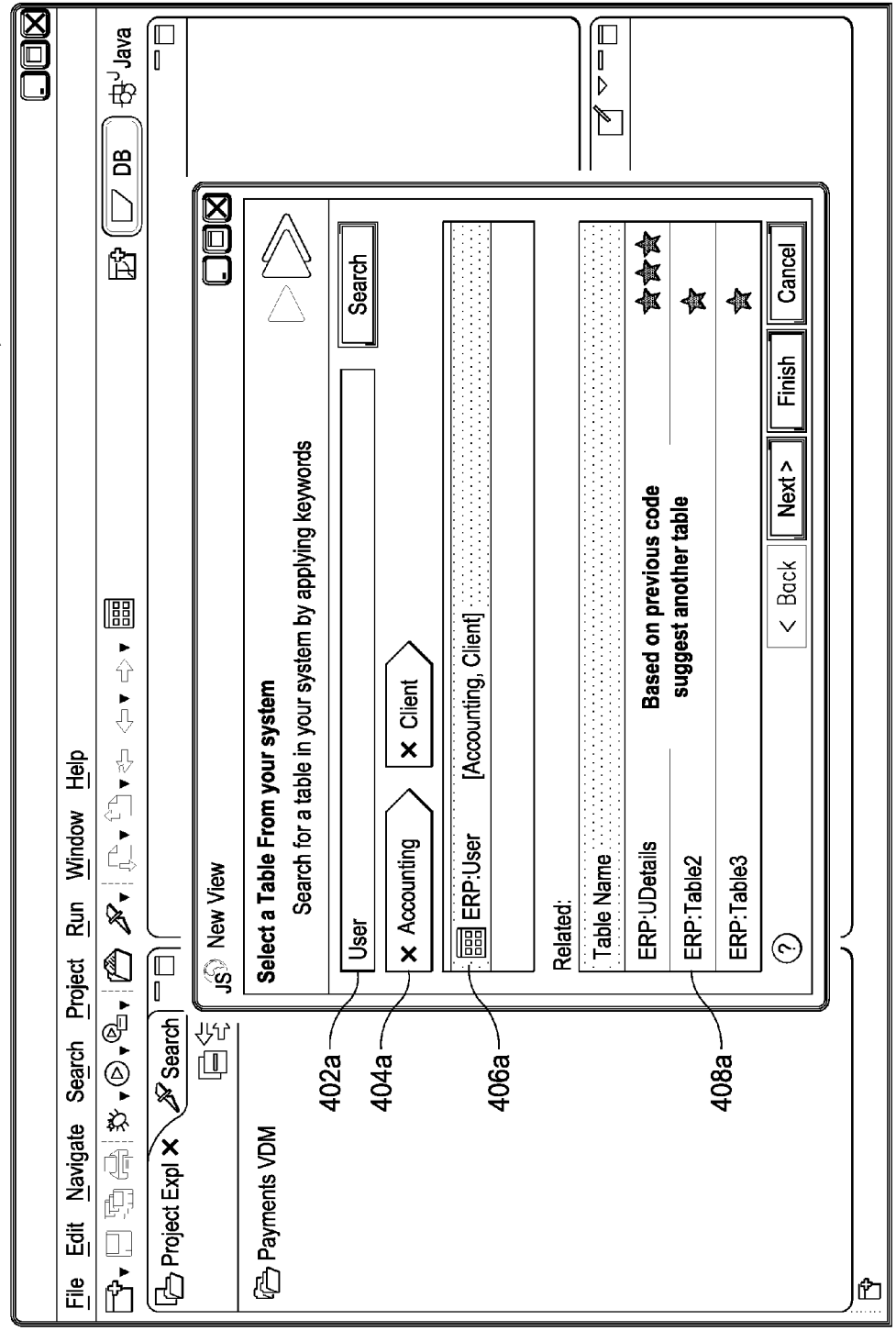
FIGS. 4A-4C illustrate example graphical user interfaces providing proactive recommendations for database table software entities according to one implementation.
Figure 4B:
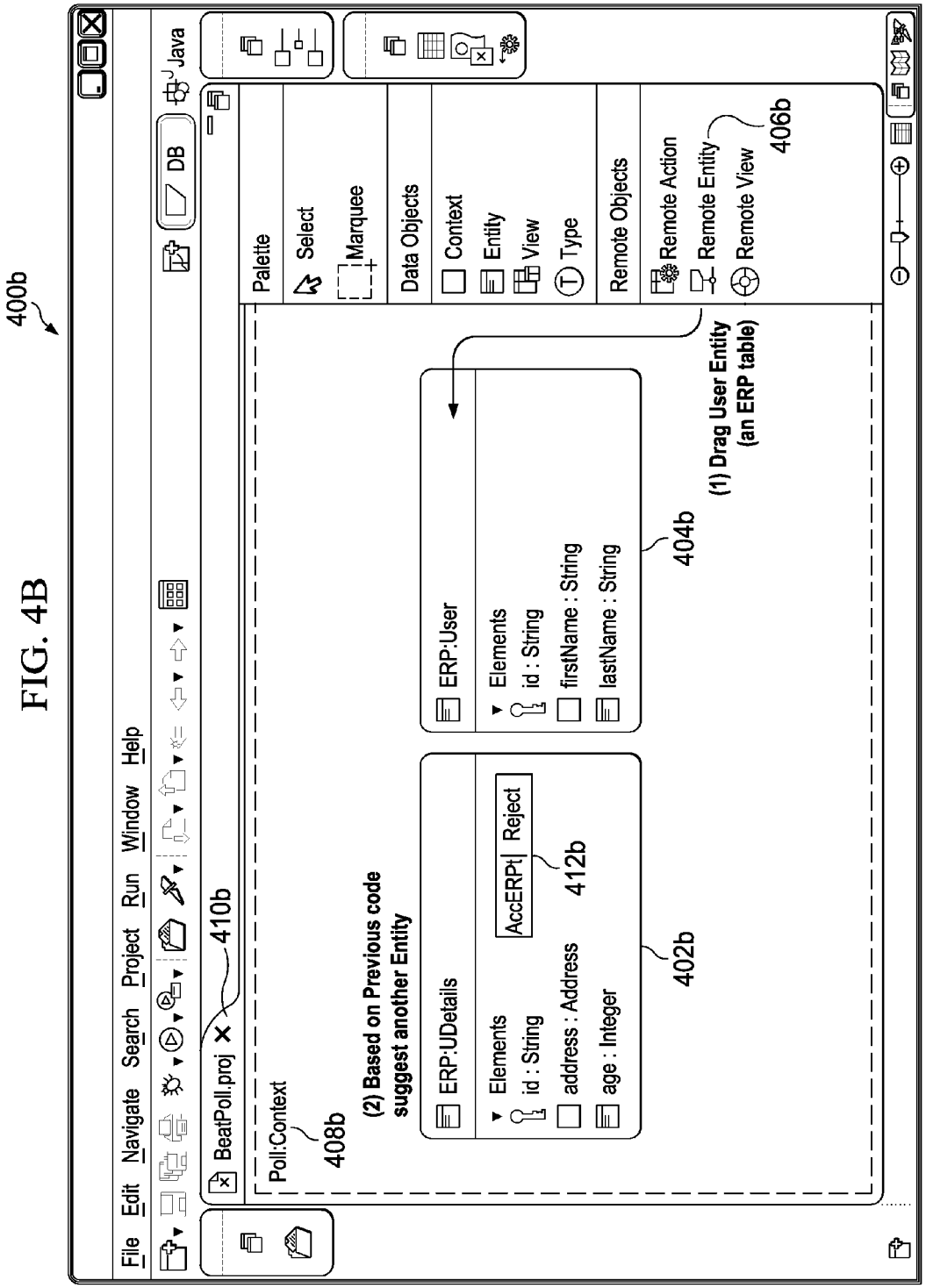
Figure 4C:
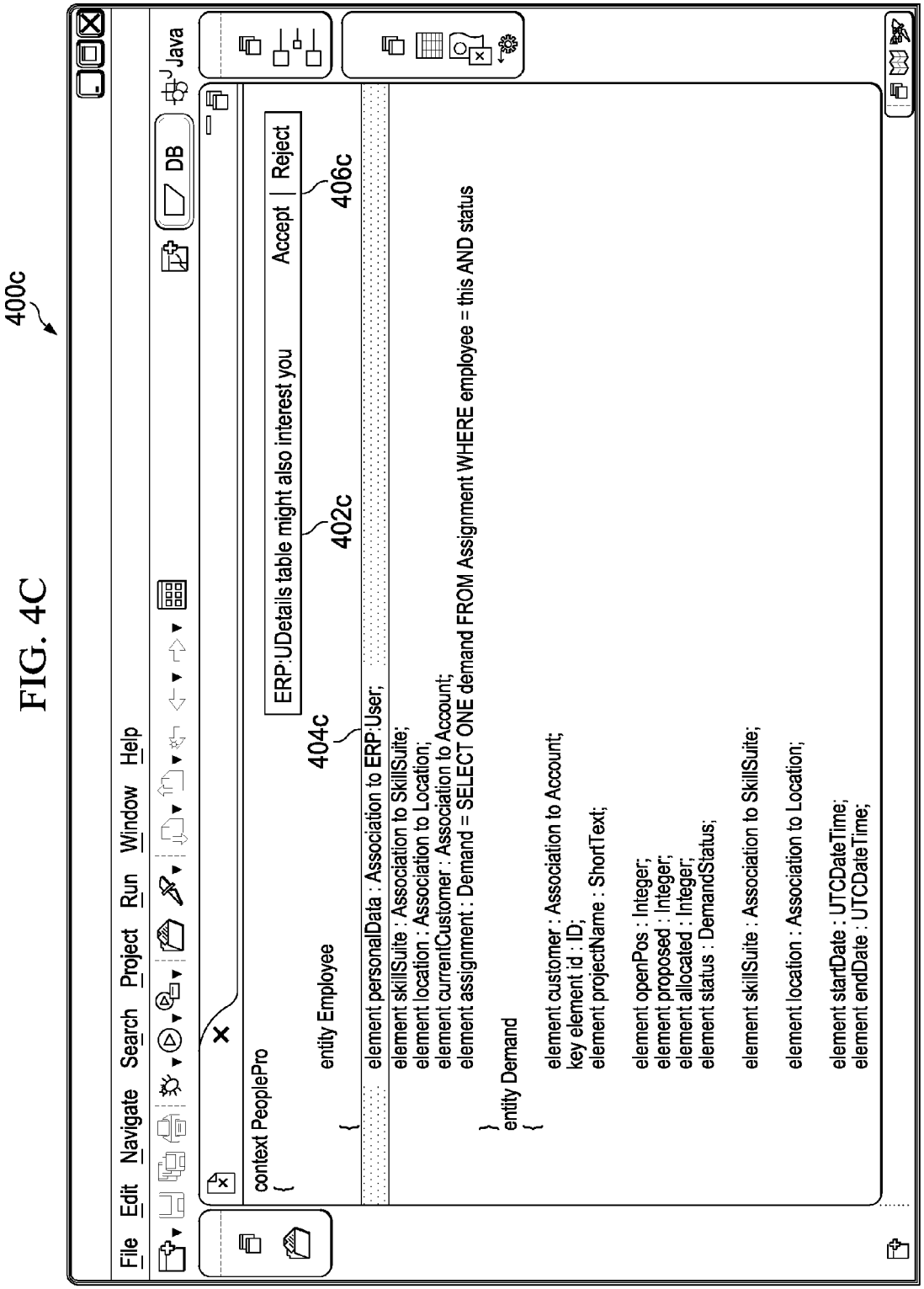

FIGS. 4A-4C illustrate example graphical user interfaces providing proactive recommendations for database table software entities according to one implementation. Referring to FIG. 4A, GUI 400*a* is illustrated providing search functionality for one or more software entities. For example, a software developer is shown to have typed "User" into search box 402*a*. Filters "Accounting" and "Client" (filtering by module name) are shown added at 404*a*. Any suitable method of adding the filters to the GUI 400*a* are envisioned as within the scope of the disclosure. The "X" associated with each filter value GUI element allows the filters to be removed from the GUI 400*a*. Results 406*a* indicate that the database table software entity "User" was located in the "Accounting" and "Client" modules as described above with respect to FIGS. 2A-2B and 3. Values for suggestion box 408*a* are drawn from the ERD 116, for example as illustrated in FIG. 3. The values indicate suggestions of additional software entities to include with the database table software entity "USER." For example, database table "UDetails" is recommended to be included with the use of database table "USER." The three stars shown to the right of the "ERP:UDetails" entry indicate that this table has a higher relatedness value (as shown/described with respect to FIG. 3, box 304) and/or ranking as compared to "ERP:Table2" and "ERP:Table3" (as shown/described with respect to FIG. 3, boxes 308 and 310).

Referring to FIG. 4B, GUI 400*b* is illustrated providing a suggestion for an additional database table software entity "ERP:UDetails" 402*b* when the "ERP:USER" database table software entity 404*b* is specified, for example by a software developer, after selecting "Remote Entity" 406*b* (e.g., in a dialog box, menu, etc.) and the resulting "ERP:USER" 404*b* is then dragged as a "Remote Entity" 406*b* into the "Poll: Context" design area 408*b* of the "BeatPoll.proj" project 410*b*. The software developer then has an option 412*b* to accept or to reject the suggested addition of the "ERP:UDetails" 402*b* database table software entity. If the suggested entity is accepted, the suggested software entity is added to the design area 408*b*. If the suggested entity is rejected, the suggested software entity is removed from the design area 408*b*. In some implementations, more than one suggestions may be made, for example all the values as displayed in the suggestion box 408*a* described in relation to FIG. 4A. In some implementations, resultant acceptance(s)/rejection(s) is(are) stored in either the ERS 114 and/or the ERD 116 for historical and other suitable uses consistent with this disclosure.

Referring to FIG. 4C, GUI 400*c* is illustrated providing a suggestion "dialog" 402*c* for an additional database table software entity "ERP:UDetails" when a reference to the "ERP:USER" database table software entity 404*c* is typed in a line of software code. The suggestion dialog 402*c* recommends "ERP:UDetails" because this database table has been determined to be a related software entity with the highest relatedness value and/or ranking value (as illustrated in FIG. 4A at 408*a*. In some implementations, the suggestion dialog 402*c* can show multiple values corresponding to related/ranked software entities. The software developer has an option 406*c* to accept or to reject the suggested addition of each suggested software entity. If a suggested entity is accepted, the suggested software entity can be added to the software code as an additional software code line (not illustrated). If a suggested entity is rejected, the suggested software entity is not added to the software code. In some implementations, more than one suggestion may be selected by the software developer to insert, for example, multiple software code lines. In some implementations, resultant acceptance(s)/rejection(s) is(are) stored either the ERS 114 and/or the ERD 116 for historical and other suitable uses consistent with this disclosure.

Figure 5:
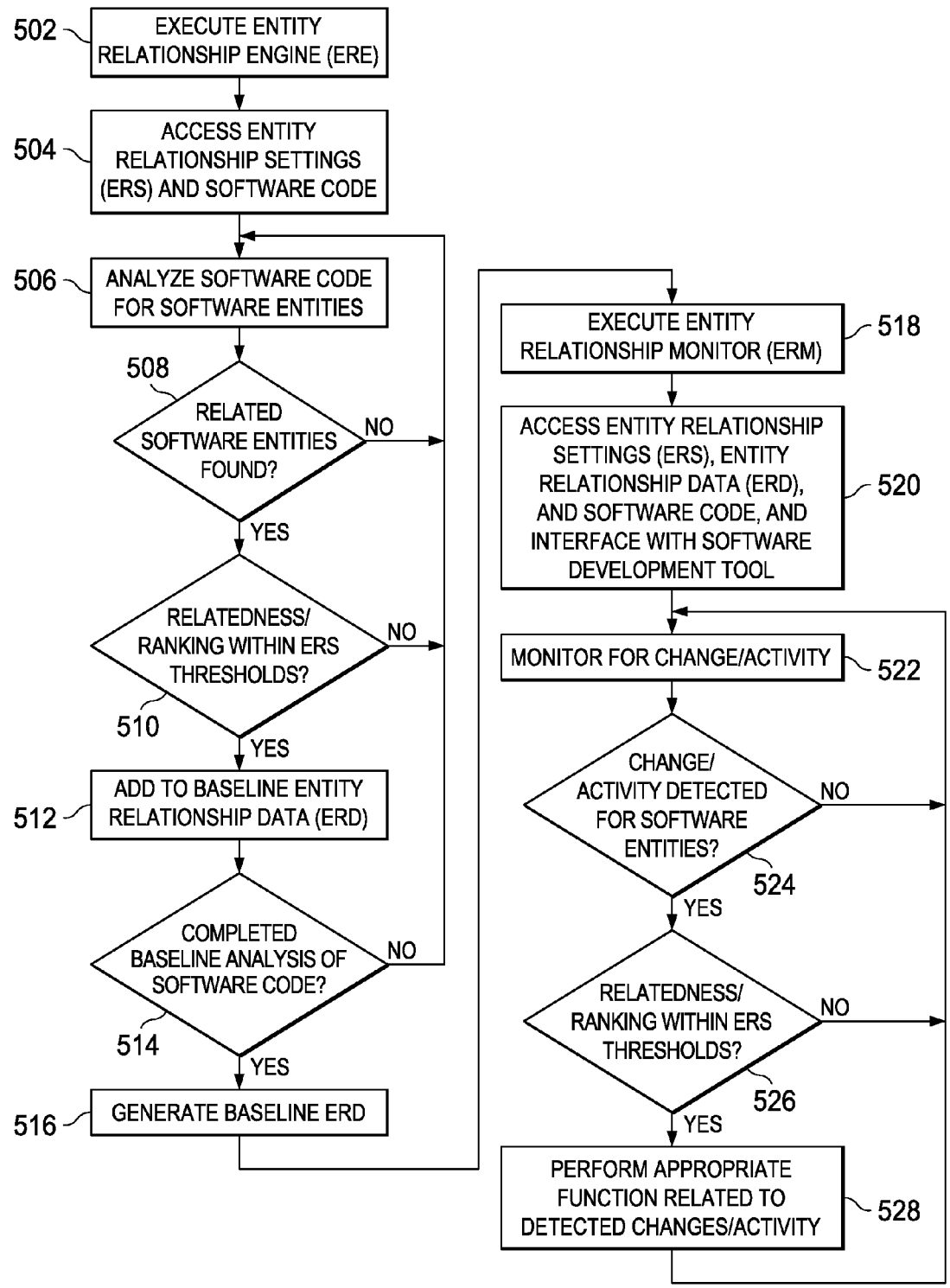
FIG. 5 is a flow chart of a method for enriching an entity relational model.

FIG. 5 is a flow chart of a method 500 for enriching an entity relational model. For clarity of presentation, the description that follows generally describes method 500 in the context of FIGS. 1, 2A-2B, 3, and 4A-4C. However, it will be understood that method 500 may be performed, for example, by any other suitable system, environment, software, and hardware, or a combination of systems, environments, software, and hardware as appropriate.

At 502, an entity relationship engine (ERE) is executed to create baseline entity relationship data (ERD) for software code. The ERE locates and prepares to access the ERS and software code. From 502, method 500 proceeds to 504.

At 504, the ERE accesses entity relationship settings (ERS) and software code. The ERS is analyzed and the ERE configured accordingly. The software code is loaded and prepared to be analyzed. From 504, method 500 proceeds to 506.

At 506, the ERE analyzes the software code for software entities using the ERS. From 506, method 500 proceeds to 508.

At 508, a determination is made whether related software entities are found in the software code. If related software entities are found in the software code, method 500 proceeds to 510. Otherwise, method 500 proceeds to 506.

At 510, a relatedness/ranking value is determined for related software entities. A determination is made whether the relatedness/ranking of determined related software entities are within ERS thresholds for inclusion within the ERD. If, the relatedness/ranking is determined to be within ERS thresholds, method 500 proceeds to 512. Otherwise, method 500 proceeds to 506.

At 512, the determined related software entities are added to baseline ERD. From 512, method 500 proceeds to 514.

At 514, a determination is made whether the baseline analysis of the software code has been completed by the ERE. If it is determined that the baseline analysis of the software code is complete, method 500 proceeds to 516. Otherwise, method 500 proceeds to 506.

At 516, a baseline ERD is generated in memory for access by components of the example distributed computing system. From 516, method 500 proceeds to 518.

At 518, an entity relationship monitor (ERM) is executed to monitor the software code and/or software development tool for changes related to software entities. Typically the ERM is a service that monitors the software code for changes and/or the software development tool for activities related to software entities. From 518, method 500 proceeds to 520.

At 520, the ERM locates and accesses the ERS, ERD, and/or software code and interfaces with the software development tool. From 520, method 500 proceeds to 522.

At 522, the ERM begins to monitor the software code for changes and software development tool for activities related to software entities. From 522, method 500 proceeds to 524.

At 524, a determination is made whether changes/activity has been detected with respect to the software code/software development tool respectively. If it is determined that changes/activity have been detected, method 500 proceeds to 526. Otherwise, method 500 proceeds to 522.

At 526, a relatedness/ranking value is determined for changes/activity to related software entities. A determination is made whether the relatedness/ranking of the related software entities related to the detected changes/activity are within ERS thresholds for inclusion within the ERD. If, the relatedness/ranking is determined to be within ERS thresholds, method 500 proceeds to 528. Otherwise, method 500 proceeds to 522.

At 528, an appropriate function is performed related to the detected change/activity. For example, if a software entity is added to the software code, the ERM updates the ERD to reflect the addition while if a software entity is deleted from the software code, the ERM updates the ERD to reflect the deletion. In another example, if a first software entity is identified in the software development tool, the ERM can proactively recommend a second software entity to also use with the first based on the accessed ERD. Additional example functions are described above with respect to the ERM and others consistent with this disclosure should be apparent to those of skill in the art.

While the disclosure discusses enriching an ERM with respect to software entities, the scope of the disclosure is not limited to software entities. As will be appreciated by those of skill in the art and consistent with the scope of this disclosure, other entities, for example hardware entities, can be added, updated, and/or deleted from an ERM and proactively recommended based upon entity relationship data.

While, FIGS. 4A-4C illustrate and describe various example GUIs, FIGS. 4A-4C and FIG. 5 are meant only as representative examples of many possible implementations and are not meant to limit in any way enriching an ERM. Those of skill in the art will appreciate the multitude of possible implementations that may be used to accomplish the described functionality.

Implementations of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible, non-transitory computer-storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., a central processing unit (CPU), a FPGA (field programmable gate array), or an ASIC (application-specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatuses with or without conventional operating systems, for example LINUX, UNIX, WINDOWS, MAC OS, ANDROID, IOS or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third party services, components, libraries, and such, as appropriate. Conversely, the features and functionality of various components can be combined into single components as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., a CPU, a FPGA, or an ASIC.

Computers suitable for the execution of a computer program include, by way of example, can be based on general or special purpose microprocessors or both, or any other kind of CPU. Generally, a CPU will receive instructions and data from a read-only memory (ROM) or a random access memory (RAM) or both. The essential elements of a computer are a CPU for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a global positioning system (GPS) receiver, or a portable storage device, e.g., a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, e.g., erasable programmable read-only memory (EPROM), electrically-erasable programmable read-only memory (EEPROM), and flash memory devices; magnetic disks, e.g., internal hard disks or removable disks; magneto-optical disks; and CD-ROM, DVD+/−R, DVD-RAM, and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), or plasma monitor, for displaying information to the user and a keyboard and a pointing device, e.g., a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or GUI, may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of wireline and/or wireless digital data communication, e.g., a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n and/or 802.20, all or a portion of the Internet, and/or any other communication system or systems at one or more locations. The network may communicate with, for example, Internet Protocol (IP) packets, Frame Relay frames, Asynchronous Transfer Mode (ATM) cells, voice, video, data, and/or other suitable information between network addresses.

The computing system can include clients and servers. A client and server are generally remote from each other and typically interact through a communication network. The relationship of client and server arises by virtue of computer programs running on the respective computers and having a client-server relationship to each other.

In some implementations, any or all of the components of the computing system, both hardware and/or software, may interface with each other and/or the interface using an application programming interface (API) and/or a service layer. The API may include specifications for routines, data structures, and object classes. The API may be either computer language independent or dependent and refer to a complete interface, a single function, or even a set of APIs. The service layer provides software services to the computing system. The functionality of the various components of the computing system may be accessible for all service consumers via this service layer. Software services provide reusable, defined business functionalities through a defined interface. For example, the interface may be software written in JAVA, C++, or other suitable language providing data in extensible markup language (XML) format or other suitable format. The API and/or service layer may be an integral and/or a standalone component in relation to other components of the computing system. Moreover, any or all parts of the service layer may be implemented as child or sub-modules of another software module, enterprise application, or hardware module without departing from the scope of this disclosure.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation and/or integration of various system modules and components in the implementations described above should not be understood as requiring such separation and/or integration in all implementations, and it should be understood that the described program components and systems can generally be integrated together in a single software product or packaged into multiple software products.

Particular implementations of the subject matter have been described. Other implementations, alterations, and permutations of the described implementations are within the scope of the following claims as will be apparent to those skilled in the art. For example, the actions recited in the claims can be performed in a different order and still achieve desirable results.

Accordingly, the above description of example implementations does not define or constrain this disclosure. Other changes, substitutions, and alterations are also possible without departing from the spirit and scope of this disclosure.

What is claimed is:

1. A computer-implemented method comprising:
   accessing entity relationship settings (ERS), entity relationship data (ERD), and software code with an entity relationship monitor (ERM);
   performing a baseline analysis of the software code for the presence of software entities;
   determining that a relatedness value associated with found related software entities in the baseline analysis of the software code is within a relatedness threshold specified by the ERS;
   monitoring software code by a computer for changes related to software entities associated with the software code;
   interfacing with a software development tool to monitor for activity in the software development tool related to the software entities;
   determining that a change or activity related to the software entities has occurred;
   determining that a relatedness value associated with the software entities associated with the change or activity is within a relatedness threshold specified by the ERS; and
   performing a function associated with the determined change or activity.

2. The computer-implemented method of claim 1, wherein the determining of the relatedness value associated with the software entities associated with the change or activity also includes determining that a ranking value associated with the software entities associated with the change or activity is within a ranking threshold specified by the ERS.

3. The computer-implemented method of claim 1, wherein for detected changes to monitored software code associated with the software entities, the function includes the ERM updating the ERD to reflect the detected changes to the monitored software code.

4. The computer-implemented method of claim 1, wherein for detected activity in the software development tool associated with at least one software entity, the function includes the ERM providing recommendations pertaining to a related software entity indicated in the ERD as related to the at least one software entity.

5. The computer-implemented method of claim 1, further comprising:
   accessing the ERS and the software code with an executing entity relationship engine (ERE); and
   generating a baseline ERD and adding the found related software entities to the generated baseline ERD.

6. The computer-implemented method of claim 5, wherein the determining of a relatedness value also includes determining that a ranking value associated with the found related software entities is within a ranking threshold specified by the ERS.

7. The computer-implemented method of claim 5, further comprising determining that the baseline analysis of the software code is completed.

8. A non-transitory, computer-readable medium storing computer-readable instructions executable by a computer to:
   access entity relationship settings (ERS), entity relationship data (ERD), and software code with an entity relationship monitor (ERM);
   perform a baseline analysis of the software code for the presence of software entities;
   determine that a relatedness value associated with found related software entities in the baseline analysis of the software code is within a relatedness threshold specified by the ERS;
   monitor software code for changes related to software entities associated with the software code;
   interface with a software development tool to monitor for activity in the software development tool related to the software entities;
   determine that a change or activity related to the software entities has occurred;
   determine that a relatedness value associated with the software entities associated with the change or activity is within a relatedness threshold specified by the ERS; and
   perform a function associated with the determined change or activity.

9. The medium of claim 8, wherein the determining of the relatedness value associated with the software entities associated with the change or activity also includes determining that a ranking value associated with the software entities associated with the change or activity is within a ranking threshold specified by the ERS.

10. The medium of claim 8, wherein for detected changes to monitored software code associated with the software entities, the function includes the ERM updating the ERD to reflect the detected changes to the monitored software code.

11. The medium of claim 8, wherein for detected activity in the software development tool associated with at least one software entity, the function includes the ERM providing recommendations pertaining to a related software entity indicated in the ERD as related to the at least one software entity.

12. The medium of claim 8, further comprising instructions executable to:
   access the ERS and the software code with an executing entity relationship engine (ERE);
   and
   generate a baseline ERD and adding the found related software entities to the generated baseline ERD.

13. The medium of claim 12, wherein the determining of a relatedness value also includes determining that a ranking value associated with the found related software entities is within a ranking threshold specified by the ERS.

14. The medium of claim 12, further comprising further comprising instructions executable to determine that the baseline analysis of the software code is completed.

15. A computer system, comprising:
   a memory configured to hold software code; and
   at least one computer interoperably coupled to the memory and configured to:
      access entity relationship settings (ERS), entity relationship data (ERD), and the software code with an entity relationship monitor (ERM);
      performing a baseline analysis of the software code for the presence of software entities;
      determining that a relatedness value associated with found related software entities in the baseline analysis of the software code is within a relatedness threshold specified by the ERS
      monitor the software code for changes related to software entities associated with the software code;
      interface with a software development tool to monitor for activity in the software development tool related to the software entities;
      determine that a change or activity related to the software entities has occurred;
      determine that a relatedness value associated with the software entities associated with the change or activity is within a relatedness threshold specified by the ERS; and
      perform a function associated with the determined change or activity.

16. The system of claim 15, wherein the determining of the relatedness value associated with the software entities associated with the change or activity also includes determining that a ranking value associated with the software entities associated with the change or activity is within a ranking threshold specified by the ERS.

17. The system of claim 15, wherein for detected changes to monitored software code associated with the software entities, the function includes the ERM updating the ERD to reflect the detected changes to the monitored software code.

18. The system of claim 15, wherein for detected activity in the software development tool associated with at least one software entity, the function includes the ERM providing recommendations pertaining to a related software entity indicated in the ERD as related to the at least one software entity.

19. The system of claim 15, further configured to:
   access the ERS and the software code with an executing entity relationship engine (ERE);
   and
   generate a baseline ERD and adding the found related software entities to the generated baseline ERD.

20. The system of claim 19, wherein the determining of a relatedness value also includes determining that a ranking value associated with the found related software entities is within a ranking threshold specified by the ERS.

21. The system of claim 19, further configured to determine that the baseline analysis of the software code is completed.

* * * * *